US007173541B2

(12) United States Patent
Park et al.

(10) Patent No.: US 7,173,541 B2
(45) Date of Patent: Feb. 6, 2007

(54) REMOTE CONTROLLER, REMOTE CONTROLLED ELECTRONIC DEVICE, REMOTE CONTROL SYSTEM FOR ELECTRONIC DEVICE AND METHOD THEREOF

(75) Inventors: Ji-won Park, Seoul (KR); Hun-sok Oh, Gyunggi-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 478 days.

(21) Appl. No.: 10/270,489

(22) Filed: Oct. 16, 2002

(65) Prior Publication Data

US 2003/0071927 A1 Apr. 17, 2003

(30) Foreign Application Priority Data

Oct. 17, 2001 (KR) .............................. 2001-63994

(51) Int. Cl.
*G05B 19/02* (2006.01)
*H04N 5/44* (2006.01)

(52) U.S. Cl. ................................ 340/825.22; 348/734

(58) Field of Classification Search ........... 340/825.69, 340/825.72, 825.52, 825.22, 825.24–825.25, 340/3.7, 3.71, 426.15; 348/734; 341/167
See application file for complete search history.

(56) References Cited

U.S. PATENT DOCUMENTS 5,109,222 A * 4/1992 Welty .................... 340/825.72
5,227,780 A * 7/1993 Tigwell ................. 340/825.72
5,386,251 A * 1/1995 Movshovich ............... 348/734
5,539,391 A * 7/1996 Yuen ..................... 340/825.72
5,554,979 A * 9/1996 Kohar et al. ........... 340/825.72
5,619,191 A * 4/1997 Lambropoulos et al. ... 340/5.22
5,872,562 A * 2/1999 McConnell et al. ........ 345/169
6,005,508 A * 12/1999 Tsui ........................... 341/173
6,008,736 A * 12/1999 Palm et al. ............ 340/825.22
6,157,319 A * 12/2000 Johns et al. ........... 340/825.72
6,396,549 B1 * 5/2002 Weber ......................... 348/734
6,549,143 B1 * 4/2003 O'Donnell et al. .... 340/825.69
6,567,011 B1 * 5/2003 Young et al. .......... 340/825.69
6,636,272 B1 * 10/2003 Noguchi et al. ............ 348/734
6,791,449 B2 * 9/2004 Dewan ...................... 340/5.25

FOREIGN PATENT DOCUMENTS

JP 2000156792 A * 6/2000

* cited by examiner

*Primary Examiner*—Jeffery Hofsass
*Assistant Examiner*—Kimberly Jenkins
(74) *Attorney, Agent, or Firm*—Sughrue Mion, PLLC

(57) ABSTRACT

A remote controller, a remote controlled electronic device, a remote control system for an electronic device and a remote control method for an electronic device are provided. The remote controller outputs a control code corresponding to a device ID, a device ID setting/change command and an operation command with respect to one or more electronic devices input from a user. The electronic device receives the device ID and/or control code from the remote controller and stores the received device ID. A control unit of the electronic device determines whether to operate in response to a control code received from the remote controller by checking whether the received device ID matches with the stored device ID. An output unit of the electronic device displays the device ID and/or a function in operation.

17 Claims, 3 Drawing Sheets

REMOTE CONTROLLER, REMOTE CONTROLLED ELECTRONIC DEVICE, REMOTE CONTROL SYSTEM FOR ELECTRONIC DEVICE AND METHOD THEREOF

BACKGROUND OF THE INVENTION

1. Field of the Invention

The present invention generally relates to a remote controller, a remote controlled electronic device, a remote controlling system for an electronic device and a remote controlling method for an electronic device. More particularly, the present invention relates to a remote controller for controlling a plurality of electronic devices, a plurality of electronic devices controlled by a single remote controller, and a method for controlling the plurality electronic devices with the single remote controller.

2. Description of the Prior Art

Generally, electronic devices like television, audio system and digital video disk player (DVDP) are controlled not only by the operation commands input through buttons provided thereon, but also by operations commands input via a remote controller. For the convenience it provides, the remote controller is widely used in almost all types of the electronic devices. Although the remote controller provides a user of the electronic device with the advantages such as improved mobility, there is an additional inconvenience when the user needs to use different types of electronic devices. That is, the user must to have remote controllers for the respective electronic devices in use.

An integrated type of remote controller, which is aimed at controlling a plurality of electronic devices, has been thus welcomed by many users as it could overcome the above-mentioned inconvenience. The currently available integrated remote controller adopts a system by which control codes of categories such as manufacturers or products are input via the remote controller, making the users select a control code corresponding to the electronic device the user possess. This system, however, is not very effective when it comes to controlling the same type of products.

The same types of electronic devices, which are manufactured by the same manufacturer, can be controlled by a single remote controller, as they share the same control code. A problem exists that the user often faces the situation in which other unintended devices are also controlled by the remote controller in addition to the device the user intends to control. For example, in the case that the user wants to control a certain TV of a multi-cube of plurality of stocked TVs in relation to the contrast or the channel, the user has to directly use the operation panel of the intended TV instead of using the remote controller or maintain the remote controller at a position closer to the intended TV before the control.

In an attempt to solve the above-mentioned inconvenience, a way of installing communication equipment like UART, or installing a separate control device for receiving the control commands from the remote controller and outputting the control commands to the intended TV, has been proposed. This proposal, however, also presents several problems, as it requires additional equipment other than the TV and the remote controller. As a result, users have to bear the higher costs for the additional equipments, while a lot more time and labor are consumed for the installation of such additional equipment.

SUMMARY OF THE INVENTION

In view of the problems associated with the prior art, it is an object of the present invention to provide a remote controller capable of selectively controlling a plurality of electronic devices.

The above object is accomplished by a remote controller according to the present invention, including an input unit for being input with a device ID, a device ID setting/change command, and an operation command from a user with respect to one or more electronic device; an output unit for outputting a control code for controlling an operation of the electronic device; and a control unit for outputting a control command to the output unit when being input with the device ID and/or the operation command from the user with respect to the electronic device, the control command directing to output the control code corresponding to the device ID and the operation command.

It is another object of the present invention to provide an electronic device capable of selectively operating in response to a control signal received from the remote controller.

This object is accomplished by an electronic device according to the present invention, including a receiving unit for receiving a device ID and/or a control code from a remote controller; a storing unit for storing the device ID; and a control unit for checking whether the device ID received from the remote controller matches with the device ID stored in the storing unit, and determining whether to perform an operation in response to the control code from the remote controller according to the checked result.

The control unit outputs a control command to replace the device ID stored in the storing unit with the received device ID, when the control unit receives the control code directing the change of the device ID from the remote controller.

Further provided is an output unit for displaying the device ID and/or a function in operation. The control unit outputs a control command to display/delete the device ID to the output unit irrespective of the checked result, when the control unit receives the control code corresponding to display/deletion of the device ID from the remote controller. The control unit performs the operation corresponding to the received control code irrespective of the checked result, when the control code from the remote controller corresponds to a power on/off.

It is yet another object of the present invention to provide a remote control system for selectively controlling a plurality of electronic devices.

This object is accomplished by a remote control system for an electronic device according to the present invention, including a remote controller for outputting a control signal for directing a setting or change of a device ID; and one or more electronic device for, upon receipt of the device ID and/or a control code from the remote controller, determining whether to perform an operation in response to the received control code from the remote controller by checking whether the received device ID matches with a pre-stored device ID.

The remote controller includes a setting unit for setting the device ID in one or more display unit; an outputting unit for outputting a control code for controlling an operation of the display unit; an input unit for being input with an operation command from a user; and a control unit for, upon receipt of the device ID and/or the operation command from the user with respect to the electronic device, outputting a control code corresponding to the received device ID and the operation command to the output unit.

The control unit outputs a control command to replace the device ID stored in the storing unit with the received device ID when the control unit receives a control code from the remote controller directing a change of the device ID.

Further provided is an output unit for displaying the device ID and/or a function in operation. The control outputs a control command to the output unit directing to display/delete the device ID irrespective of whether the received device ID matches with the stored device ID or not, when the control unit receives a control code corresponding to the display/deletion of the device ID from the remote controller. The control unit outputs a control command directing to perform the operation in response to a received control code from the remote controller irrespective of whether the received device ID matches with the stored device ID or not, when the control code from the remote controller corresponds to a power on/off.

It is yet another object of the present invention to provide a remote method for selectively controlling a plurality of electronic devices.

This object is accomplished by a remote control method of an electronic device according to the present invention, including the steps of setting a device ID for one or more electronic device through a remote controller; receiving the device ID and/or a control code from the remote controller; and determining whether to perform an operation in response to a control code received from the remote controller by checking whether the received device ID matches with the set device ID.

An operation in response to a control code received from the remote controller is performed irrespective of whether the received device ID matches with the set device ID or not, when the control code from the remote controller corresponds to a power on/off. The set device ID is changed to the received device ID when the control code from the remote controller directs the change of the device ID.

The device ID is displayed/deleted irrespective of whether the received device ID matches with the set device ID, when the control code from the remote controller corresponds to a display/deletion of the device ID.

According to the present invention, setting and changing of the device IDs of the respective electronics is enabled through the remote controller. Accordingly, a plurality of electronic devices can be controlled at the same time. Further, as the user can change the device ID set for the respective electronic devices as he/she likes, convenience in using the devices also improves.

BRIEF DESCRIPTION OF THE DRAWINGS

The above-mentioned objects and the feature of the present invention will be more apparent by describing the preferred embodiment of the present invention in detail referring to the appended drawings, in which.

DETAILED DESCRIPTION OF PREFERRED EMBODIMENT

The present invention will be described in greater detail with reference to the accompanying drawings.

Figure 1:
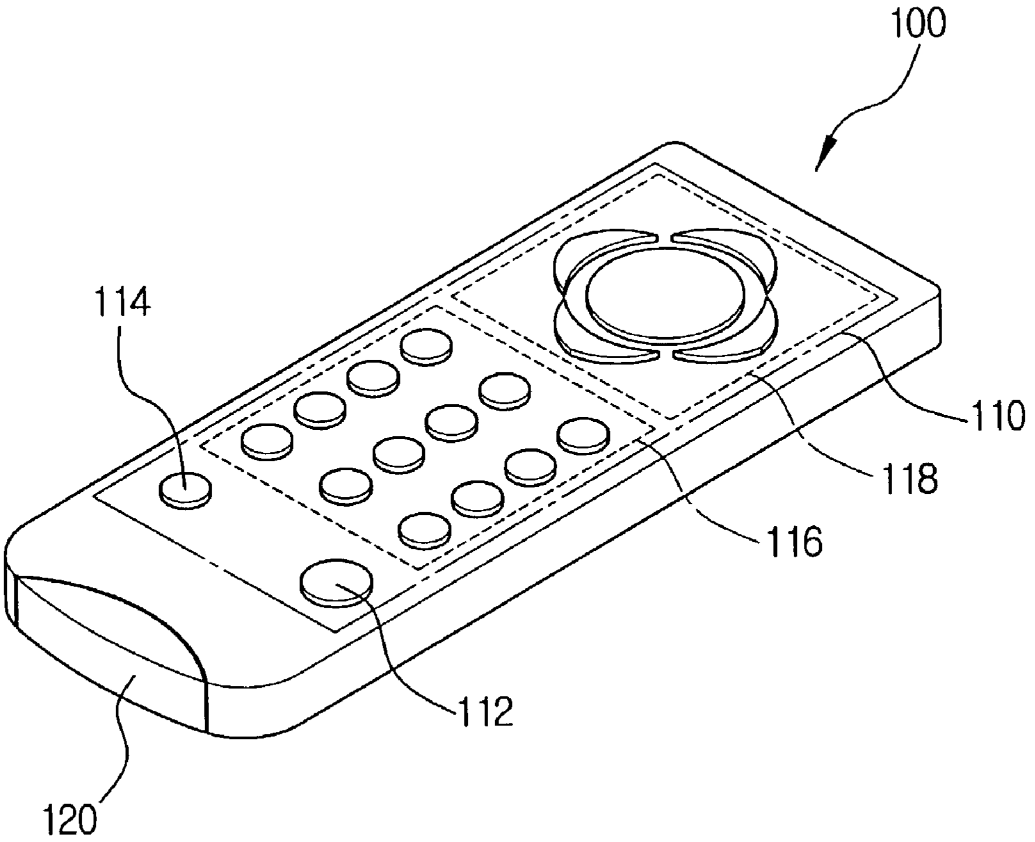
FIG. 1 is a view showing an external appearance of a remote controller according to a preferred embodiment of the present invention.

FIG. 1 shows an external appearance of a remote controller according to a preferred embodiment of the present invention.

Referring to FIG. 1, a remote controller 100 according to the present invention includes an input unit 110, an output unit 120 and a control unit (not shown). The input unit 110 is provided for inputting a device ID setting/change command, a device ID and an operation command for one or more electronic devices from a user. The output unit 120 outputs a control code for controlling the operation of the electronic device. The control unit receives the device ID and/or operation command input by the user from the input unit 110 and outputs a control signal to the output unit for outputting the control code corresponding to the input device ID and operation command.

The input unit 110 has a power button 112, a locking button 114, a data input button 116 and a selection button 118. The user turns on/off the electronic device having the remote controller receiving unit by pressing the power button 112. The data input button 116 includes a plurality of numeral or alphabet buttonswhich are used to send the numeral or text information to the electronic device. The selection button 118 is provided for outputting a menu in an on-screen display. The selection button 118 includes a setting button for selecting a certain menu, and a moving button for selecting the output menu.

The locking button 114 is used when setting and changing the device ID. When the user presses the locking button 114, a control code for releasing or setting the locking of the electronic device is output from the output unit 120. When the locking of the electronic device is released, the user selects menus like ‘device ID setting’ or ‘device ID change’ by pressing the selection button 118.

For example, when the user wishes to change the device ID, the user presses the locking button 114 so that the electronic device can operate in accordance with the control code received from the remote controller 100. Then, the user inputs the device ID of an intended electronic device by pressing the data input button 116. When the input device ID matches with the device ID of the intended device, the user selects the ‘device ID change’ by pressing the selection button 118, and inputs a new device ID by pressing the data input button 116. Once the right device ID is input, the change of device ID is completed by pressing the locking button 114. Alternatively, when the locking button 114 is pressed, the output unit 120 can output the control code for outputting the device ID of the electronic device together with the control code for releasing the locking.

Further, a separate locking button 114 may not be provided to the remote controller 100, but the locking and unlocking can be instead executed by use of the selection button 118. In this case, by the user pressing the setting button of the remote controller 100, menus like ‘ID setting’, ‘unlocking’, ‘locking’ can be output to an output portion of the electronic device that has a receiving portion to receive the control code from the remote controller 100. After input of the device ID, the user ends the 'device ID setting' by pressing the setting button.

After the 'device ID setting', the electronic device operates in response to the control code from the remote controller 100 only when i) the pre-set device ID is received, or ii) when the 'unlocking' menu is selected. When locked, the electronic device does not operate in accordance with the control code from the remote controller 100, but indicates that it is in the locked state b outputting a corresponding message in the on-screen display for a predetermined time, e.g., approximately three (3) seconds. However, it is preferred that certain control codes such as the control code for power on/off are designed to operate even in the locking state.

In the above-described embodiment, the electronic device in locking state is released upon receipt of the device ID of its own. However, the electronic device also can operate in accordance with the received control code irrespective of locking state, if the received control codes are related to power on/off and when the received control codes are due to the pressing on the setting button. In this case, by the user pressing the setting button, a message for input of the device ID of the user's desired electronic device is output to the output portion of the electronic device. Accordingly, after inputting the device ID of the desired electronic device, the user can control the desired electronic device.

Figure 2:
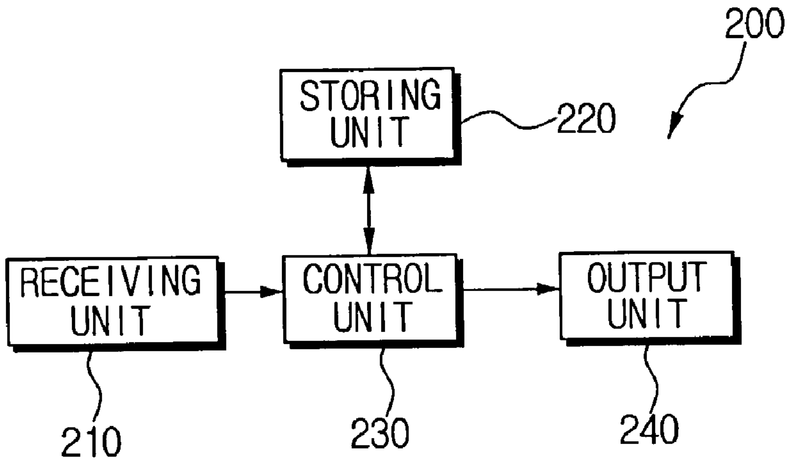
FIG. 2 is a block diagram showing the construction of an electronic device selectively operating in response to a control signal received from the remote controller according to the present invention.

FIG. 2 is a block diagram showing the construction of the electronic device selectively operating in response to the control signal received from the remote controller according to the present invention.

Referring to FIG. 2, an electronic device 200 according to the present invention includes a receiving unit 210, a storing unit 220, a control unit 230 and an output unit 240. As for the electronic device 200, any electronic device capable of receiving the control code from the remote controller 100, namely a display monitor, a TV, an air-conditioner, may be employed.

The receiving unit 210 receives the device ID and/or control code from the remote controller 100. The storing unit 220 stores the device ID set through the remote controller 100. The control unit 230 checks whether the received device ID matches with the stored device ID, and determines whether to perform the operation in accordance with the received control code from the remote controller 100. The output unit 240 displays the device ID and/or the function in operation.

The device ID of the electronic device 200 is provided in the factory during initial manufacturing process, and stored in the storing unit 220. If there is no device ID set during the manufacturing process, the user can set the device ID for the electronic device 200 by use of the remote controller 100.

Further, the user can change the device ID of the electronic device 200 by using the remote controller 100. In this case, the user releases the locking status of the electronic device 200 through the remote controller 100. The receiving unit 210 receives the control code corresponding to the 'unlocking' and the device ID of the electronic device 200 from the remote controller 100. Upon receipt of the control code corresponding to the 'unlocking' and the device ID of the electronic device 200 at the receiving unit 210, the control unit 230 checks whether the received device ID matches with the stored device ID in the storing unit 220. If the received device ID matches with the stored device ID, the control unit 230 receives a new device ID from the remote controller 100 and stores the new device ID in the storing unit 220.

The electronic device 200 according to the present invention can selectively operate in response to the received control code from the remote controller 100 depending on whether the received device ID matches with the stored device ID. That is, the control unit 230 outputs the control signal for the corresponding operation in response to the received control code from the remote controller 100 only when the device ID is received through the receiving unit 210. If there is no device ID received, or if the received device ID does not match with the stored device ID in the storing unit 220, the control unit 230 controls operation of the electronic device 200 so that the operation corresponding to the control code from the remote controller 100 is not performed.

Figure 3:
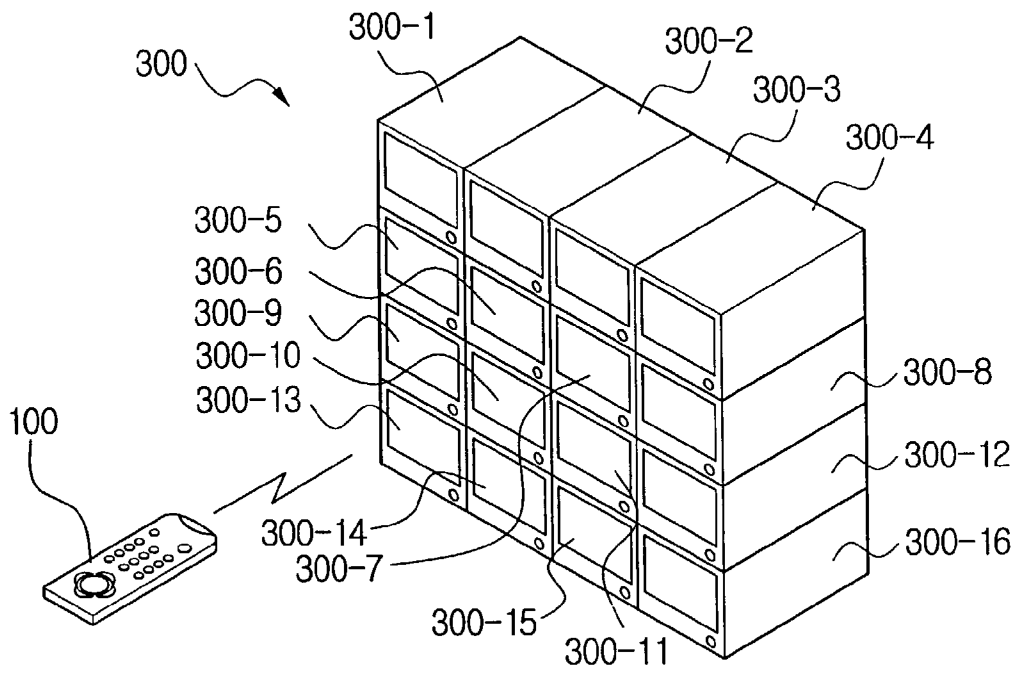
FIG. 3 is a view showing the operation of a remote control system for selectively controlling the plurality of electronic devices according to the present invention.
Figure 4:
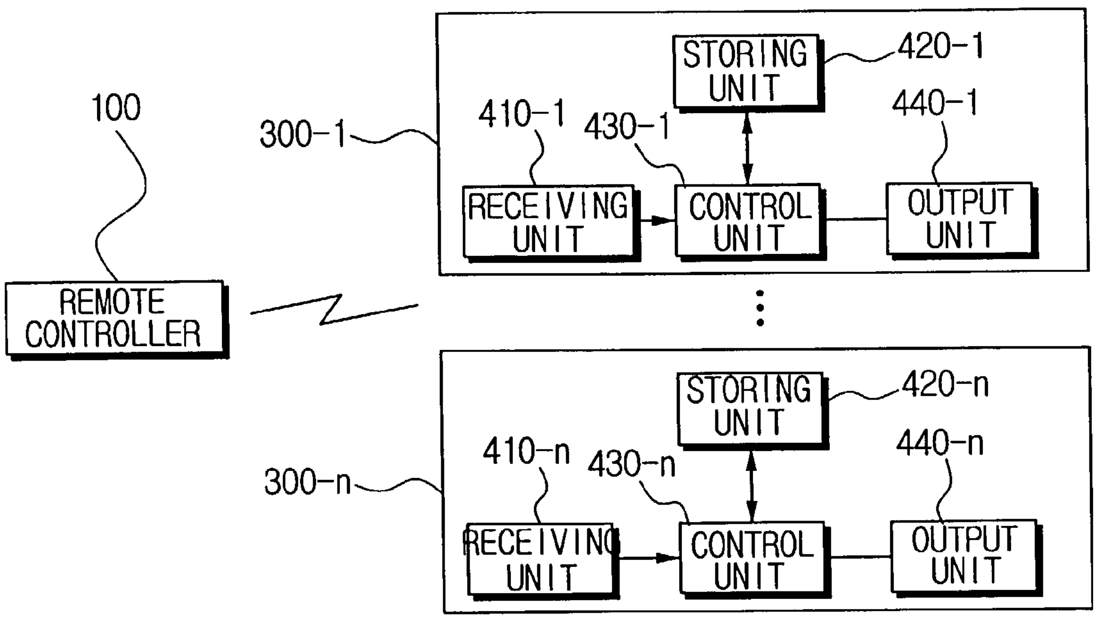
FIG. 4 is a block diagram showing the interior construction of the remote control system for selectively controlling the plurality of electronic devices according to the present invention.

FIG. 3 is a view showing the remote control system in use, for selectively controlling a plurality of electronic devices according to the present invention. FIG. 4 is a block diagram showing the interior of the remote control system according to the present invention.

Referring to FIGS. 3 and 4, a remote control system 300 according to the present invention includes the remote controller 100 and a plurality of electronic devices 300-1~300-n. For a convenience of explanation, FIG. 3 shows sixteen (16) electronic devices 300-1~300-16 stacked on each other. Since the construction and operation of the remote controller 100 and the electronic devices 300-1~300-n have been described above with reference to FIGS. 1 and 2, further description will be omitted.

Figure 5:
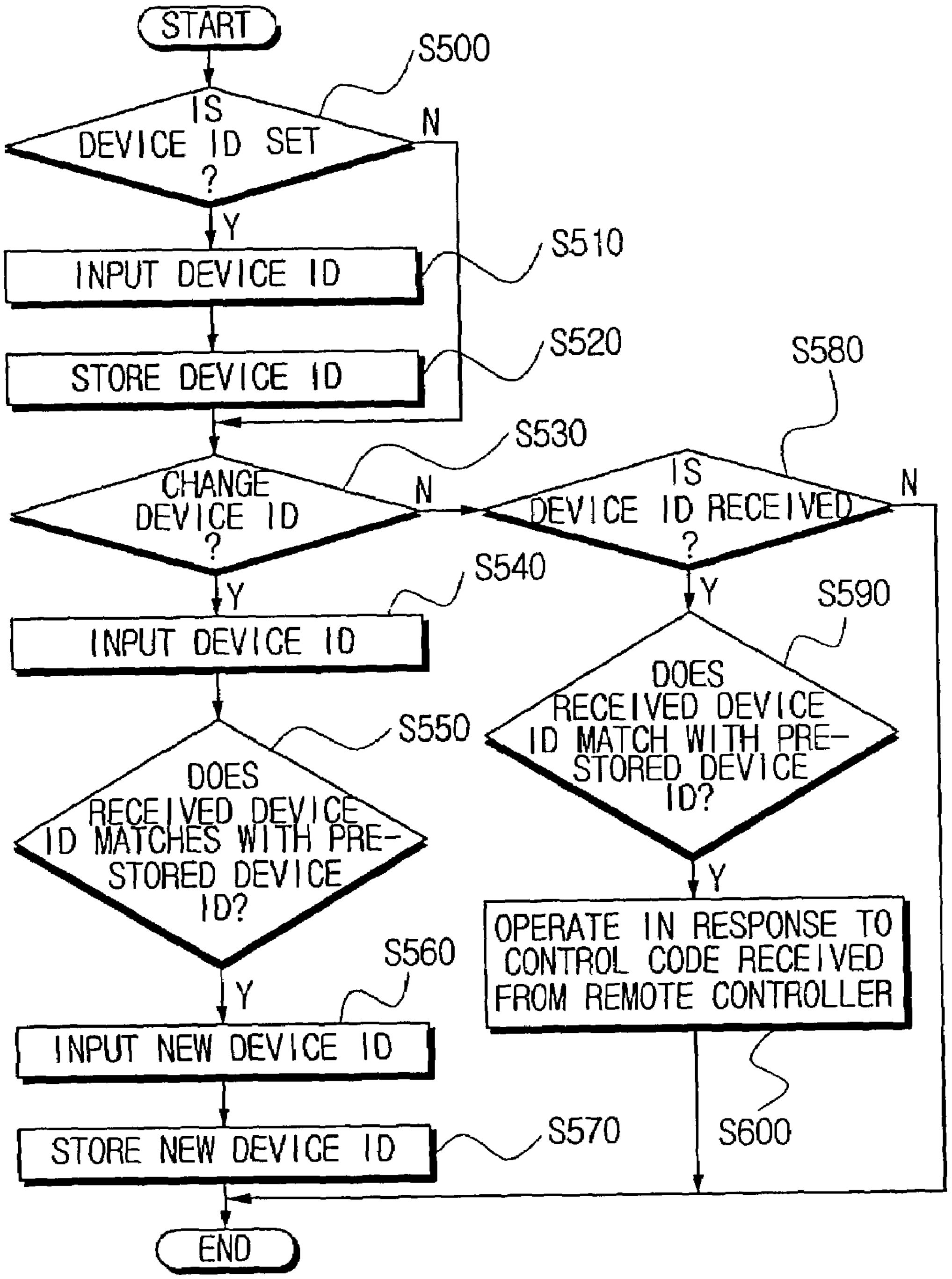
FIG. 5 is a flowchart for showing a method for selectively remote controlling the plurality of electronic devices according to the present invention.

Hereinbelow, the operation of the remote control system 300 according to the present invention will be described with reference to the flowchart of FIG. 5 showing the remote control method for selectively controlling the plurality of electronic devices according to the present invention.

Referring to FIG. 5, the user sets the device IDs of the respective electronic devices 300-1~300-16 (step S500). Here, S500 is provided as optional to the user. In other words, the device IDs of the respective electronic devices 300-1~300-16 can be set at the time of manufacturing, or can be set by the user as the user likes after the purchase of the electronic devices.

After selecting for the setting of the device IDs, the user inputs the device IDs by using the remote controller 100 (step S510). The device IDs are provided to each one of the respective electronic devices 300-1~300-16. Alternatively, the device IDs may be provided to groups of certain number of electronic devices 300-1~300-16. For example, the electronic devices 300-1~300-16 may be grouped into a plurality of groups including a first electronic device group 300-1~300-4, a second electronic device group 300-5~300-8, a third electronic device group 300-9~300-12 and a fourth electronic group 300-13~300-16, and then the first to fourth electronic device groups can be given with the device IDs, respectively. The input device IDs are stored in the storing units 420-1~420-16 of the electronic devices 300-1~300-16 (step S520).

Later, the user can change the device IDs such set for the respective electronic devices 300-1~300-16 as the need arises. That is, first, the user selects the 'device ID change' by using the remote controller 100 (step S530). Next, as the user inputs the device IDs of an intended electronic device 300-1~300-16 (step S540), the control unit 430-1~430-16 of the intended electronic device 300-1~300-16 compares the input device ID with the stored device ID in the storing unit 420-1~420-16 (step S550). When it is determined that the device IDs match with each other, the control unit 420-1~420-16 is provided with a new device ID input through the receiving unit 410-1~410-16 (step S560), and stores the new device ID in the storing unit 420-1~420-16 (step S570).

After the 'device ID setting' or 'device ID change' with respect to the electronic devices 300-1~300-16, the user ends the 'device ID setting' or 'device ID change' process by pressing the locking button 114 provided to the remote controller 100. Once the electronic devices 300-1~300-16 receive the control code corresponding to the locking button 114, the electronic devices 300-1~300-16 ignore almost all the control codes, except when the electronic devices 300-1~300-16 receive the control codes corresponding to particular buttons such as the power button 112 and the locking button 114. When the electronic devices 300-1~300-16 receive the control codes corresponding to particular buttons, such as the power button 112 and the locking button 114, the electronic devices 300-1~300-16 perform the regular operations.

Hereinbelow, the control method of the electronic devices 300-1~300-16 by using the remote controller 100 will be described in greater detail.

When the user wishes to control a certain electronic device or electronic device group, the user presses the locking button 114 provided to the remote controller 100, to thereby release the locking of the electronic device 300-1~300-16. When the electronic device 300-1~300-16 receives the control code corresponding to the 'unlocking', it is preferable that the electronic device 300-1~300-16 outputs its own device ID to the output unit 440-1~440-16 in the form of on-screen display. It is further preferred that such output device ID is deleted after a predetermined time or upon receipt of control code corresponding to the 'locking'. Naturally, such display and deletion of the device ID can be performed through a separate device ID display/delete button provided to the remote controller 100.

After the 'unlocking' of the electronic device 300-1~300-16, the user inputs the device ID of a certain electronic device that the user intends to control through the remote controller 100. When the receiving unit 410-1~410-16 receives the device ID through the receiving unit 410-1~410-16 (step S580), the control unit 430-1~430-16 checks whether the received device ID matches with the stored device ID in the storing unit 420-1~420-16 (step S590). The electronic device 300-1~300-16 of the device ID matching with the received device ID operates in accordance with the received control code from the remote controller 100 (step S600).

In the case that the electronic devices 300-1~300-16 are grouped into four (4) electronic device groups as mentioned above, the electronic devices 300-1~300-4, 300-5~300-8, 300-9~300-12, 300-13~300-16 have the same device ID. Accordingly, among the electronic device groups, the electronic devices of a selected group are controlled through the remote controller 100. If each of the electronic devices 300-1~300-16 has its own device ID, the electronic device receiving with its own device ID is controlled by the remote controller 100.

According to the remote controller 100, the remote controlled electronic devices 300-1~300-n, the remote control system of the electronic devices 300-1~300-n, and the remote control method for controlling the electronic devices 300-1~300-n in accordance with the present invention, the user does not need to move the remote controller 100 to a position closer to the intended electronic device 300-1~300-n. Instead, by displaying and inputting the device IDs of the intended electronic device 300-1~300-n by using the remote controller 100, the user can selectively control the intended electronic device 300-1~300-n. Accordingly, unintended operation of the other electronic devices 300-1~300-n can be prevented. Further, as the user can change the device ID of the electronic devices 300-1~300-n as the need arises, the plurality of electronic devices 300-1~300-n can also be controlled at the same time.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. A remote controller, comprising:

an input unit for inputting a device ID, a device ID setting/change command, and an operation command from a user with respect to at least one electronic device;

a setting unit for setting an input device ID in the electronic device, in response to the device ID setting/change command;

an output unit for outputting a control code for controlling an operation of the electronic device; and a control unit for outputting a control command to the output unit in response to receiving the device ID and/or the operation command with respect to the electronic device from the input unit, the control command directing the output unit to output the control code corresponding to the device ID and the operation command.

2. An electronic device comprising:

a receiving unit for receiving at least one of a device ID and a control code for setting or changing the device ID from a remote controller, the device ID identifies the electronic device from among a plurality of electronic devices;

a storing unit for storing the device ID; and a control unit for determining whether the device ID received from the remote controller matches with the device ID stored in the storing unit, and determining whether to perform an operation instructed by the remote controller in response to the control code from the remote controller according to the determined result of whether the received device ID matches the stored device ID.

3. The electronic device of claim 2, wherein the control unit outputs a control command to replace the device ID stored in the storing unit with the received device ID, when the control unit receives from the receiving unit the control code directing the change of the device ID received from the remote controller.

4. The electronic device of claim 2, further comprising an output unit for displaying at least one of the device ID and a function in operation.

5. The electronic device of claim 4, wherein the control unit outputs a control command to display or delete the device ID to the output unit irrespective of the determined result, when the control unit receives from the receiving unit the control code corresponding to display or deletion of the device ID received from the remote controller.

6. The electronic device of claim 2, wherein the control unit performs the operation corresponding to the received control code irrespective of the determined result, when the control code from the remote controller corresponds to a power command.

7. A remote control system for an electronic device, comprising:

a remote controller for outputting a control signal for directing a setting or change of a device ID; and at least one electronic device for, upon receipt of the device ID or a control code from the remote controller, determining whether to perform an operation instructed by the remote controller in response to the received control code from the remote controller by checking whether the received device ID matches with a pre-stored device ID.

8. The remote control system of claim 7, wherein the remote controller comprises:

a setting unit for setting the device ID in at least one display unit;

an outputting unit for outputting a control code for controlling an operation of the display unit;

an input unit for inputting an operation command from a user; and a first control unit for, upon receipt of at least one of the device ID from the setting unit and the operation command from the input unit with respect to the electronic device, outputting to the output unit a control command directing the output unit to output the control code corresponding to the received device ID and the operation command to the output unit.

9. The remote control system of claim 7, wherein the electronic device comprises:

a receiving unit for receiving at least one of the device ID and control code from the remote controller;

a storing unit for storing the device ID; and a second control unit for determining whether to perform an operation in response to a control code from the remote controller by determining whether the received device ID from the remote controller matches with the device ID stored in the storing unit.

10. The remote control system of claim 9, wherein the control unit outputs a control command to replace the device ID stored in the storing unit with the received device ID when the control unit receives the control code from the remote controller directing a change of the device ID.

11. The remote control system of claim 10, wherein the electronic device further comprises an output unit for displaying at least one of the device ID and a function in operation.

12. The remote control system of claim 11, wherein the control unit outputs a control command to the output unit directing to display or delete the device ID irrespective of whether the received device ID matches with the stored device ID, when the control unit receives from the receiving a control code corresponding to the display or deletion of the device ID received from the remote controller.

13. The remote control system of claim 9, wherein the control unit outputs a control command for performing the operation in response to a received control code from the remote controller irrespective of whether the received device ID matches with the stored device ID, when the control code from the remote controller corresponds to a power command.

14. A remote control method of an electronic device, comprising the steps of:

setting a device ID for at least one electronic device through a remote controller;

receiving at least one of the device ID and a control code from the remote controller; and determining whether to perform an operation in response to a control code received from the remote controller by determining whether the received device ID matches with the set device ID.

15. The remote control method of claim 14, wherein an operation in response to a control code received from the remote controller is performed irrespective of whether the received device ID matches with the set device ID, when the control code from the remote controller corresponds to a power command.

16. The remote control method of claim 14, wherein the set device ID is changed to the received device ID when the control code from the remote controller directs the change of the device ID.

17. The remote control method of claim 14, wherein the device ID is displayed or deleted irrespective of whether the received device ID matches with the set device ID, when the control code from the remote controller corresponds to a display or deletion of the device ID.

* * * * *